Aug. 16, 1938.                K. GULLICH                    2,127,404
   PROCESS AND APPARATUS FOR THE MANUFACTURE OF PATTERNED ARTICLES
                          Filed May 15, 1935
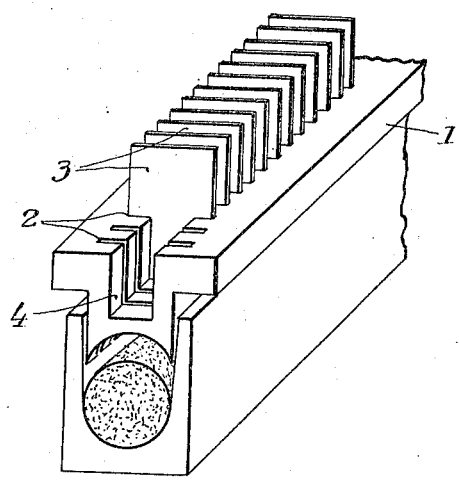
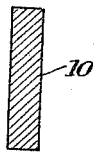
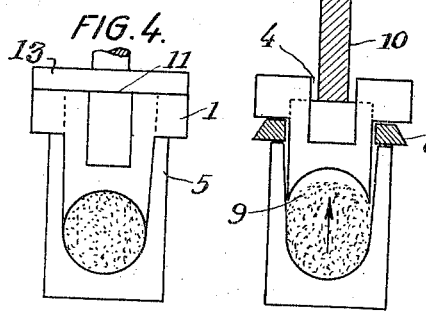
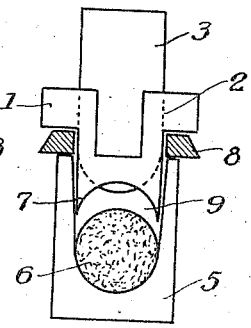
Inventor:
Kurt Gullich,
By Potter, Prince v Scheffler,
Attorneys.

Patented Aug. 16, 1938

2,127,404

UNITED STATES PATENT OFFICE 2,127,404

PROCESS AND APPARATUS FOR THE MANUFACTURE OF PATTERNED ARTICLES

Kurt Gullich, Marienberg, Germany, assignor to Bisonit G. m. b. H., Marienberg, Germany Application May 15, 1935, Serial No. 21,662
In Germany April 23, 1934

4 Claims. (Cl. 18—42)

The present invention relates to a process for the manufacture of pre-molded articles patterned right through from front to back and made from superimposed layers of differently colored molding masses, particularly albuminous substances, such as horn flour, and to an apparatus for carrying out this process.

The manufacture of tablets from a powdered molding mass for buttons, discs and other molded articles is effected in the known molds having a fixed or a movable bottom. The molding powder is filled into these molds and formed into tablets. Before forming the molding powder into tablets it may be provided with a pattern or design through the apertures of the mold according to known processes. It is, however, not possible to obtain in said mold a pattern passing right through the tablet.

Various proposals have been made to provide rod-like bodies from moldable powders and to form them with the view of producing from such rod-like structures, or from parts of same, molded articles possessing a pattern which passes right through. However, the difficulties encountered in the course of working such rod elements are considerable. In particular, it is not possible on sawing or otherwise preparing individual parts from one compressed rod element, to avoid considerable cutting waste of valuable material, which the more enhances the price the thinner the individual parts are. A further disadvantage consists in the fact that the sawing or cutting tools which must be very thin to reduce the cutting waste, soon become useless owing to wear. Therefore a frequent replacement of the cutting tools is necessary, causing unbearable expenses.

The object of the present invention is a process and a device whereby the above-mentioned disadvantages are obviated. According to this invention the moldable powder for the manufacture of a patterned body and the formation of same into tablets, is disposed in a channel or trough in which the molding powder in a noncompressed powdery condition is cut into certain individual parts and formed into tablets. The device used as cutting tool is a molding plunger or mold cover of the same shape and length as the channel or trough. Said molding plunger is slotted at predetermined intervals transversely to the longitudinal axis. These slots are of such dimensions that they serve as efficient guides for the knives to be inserted therein. The knives made of thin sheet brass or steel are given the form and dimensions corresponding to the cross-section of the inner space of the molding channel. The molding plunger is provided with as many knives as parts to be produced. For example, if it is desired to produce 75 tablets from the powdered molding mass in one channel, a molding plunger divided correspondingly and carrying 75 knives is employed.

The accompanying drawing illustrates by way of example embodiments of the device according to this invention.

Figure 1 is a perspective view of the device, the molding channel or trough being also shown.

Figure 2 is a cross-section of the device in which the knives are withdrawn.

Figure 3 shows the device in the position after pressure has been applied to the knives.

Figure 4 shows the device in the position after pressure has been applied to the molding plunger.

The device for cutting through and forming the moldable powder (Fig. 1) into tablets consists of the molding plunger 1, having slots 2, the movable knives 3, the groove 4 in the plunger and the channel or trough 5, in association with means for actuating movement of the knives in the slots, and means for limiting the inward movement of the molding plunger into the channel.

The molding plunger 1, with knives withdrawn, is introduced into the channel or trough 5, containing the moldable powder 6, as shown in Fig. 2.

The molding surface 7 of the molding plunger 1 is maintained at a certain distance above the moldable powder by a plunger holder 8 so that an empty space 9 remains. Actuated by the pressing beam 10 the knives are guided in the slots 2 and move in the direction of the molding powder filling 6 and cut through the latter at definite intervals down to the bottom of the molding channel.

The dimensions of the pressing beam 10 are such that it can enter the groove 4 of the molding plunger without the latter being subjected to pressure (Figure 3).

The molding mass displaced by the driving in of the several knives escapes in the direction of the arrow (Fig. 3) into space 9.

After removing the molding plunger support 8 the molding plunger is subjected to pressure and the molding powder is thereby compressed between the knives into tablets (Fig. 4).

On completion of the compression operation the device is in the position as shown in Figure 4. The molding plunger is pressed down as far as the upper edge of the channel 5. The cutting edges of the knives rest on the bottom of the channel and the pressing edges 11 of the knives correspond to the upper outer surface of the molding plunger.

As a result of the molding operation a number of tablets are produced from the moldable powder which correspond to the number of slots in the molding plunger. The form and shape of the tablets is determined by the shape of the space formed by the cross-section of the molding channel and molding plunger. In the drawing this shape is circular (Fig. 4). The thickness of the tablets is determined by the distance between the knives.

Since according to this invention the cutting through of the molding mass takes place within the molding channel no cutting waste is formed. The molding powder displaced by the knives remains within the pressure chamber and consequently becomes incorporated with the tablets.

In view of the fact that the knives only divide a powdery mass they are in no way worn and therefore remain serviceable for an unlimited time.

A special advantage of the process according to this invention consists in the fact that the air contained in the molding mass, on pressing the tablets, can escape through the slots of the molding plunger. Therefore no stresses due to the presence of compressed air exist inside the tablets.

What I claim is:

1. Process for simultaneously separating a mass of molding powder into a plurality of transverse portions and pre-molding the portions into moldable objects which comprises, supporting a mass of molding powder against downward and lateral movement while simultaneously dividing the mass of powder into a plurality of transverse portions, and, while separately confining the portions and supporting them against downward and lateral movement, simultaneously and separately compressing the portions.

2. Process defined in claim 1, in which the molding powder consists essentially of horn flour.

3. Apparatus for molding powders, which comprises, in combination, a channel shaped mold, a molding plunger movable into and out of said channel a portion of the undersurface of said molding plunger being profiled to provide a molding surface, a plurality of spaced transverse slots in said plunger, a plurality of movable knives adapted to be reciprocated through said slots toward and away from the bottom of said channel, movable means for supporting the molding plunger in predetermined retracted position in said channel, and means for independently applying pressure to said knives.

4. Apparatus for simultaneously preforming a plurality of moldable objects from a mass of molding powders, which comprises, in combination, a channel shaped mold, a movable plunger for said mold including a central portion, provided with a profiled bottom, adapted to be introduced into the top portion of the mold and edge portions adapted to engage the top edges of the mold and to limit the inward movement of the central portion of the plunger, movable means for supporting the plunger in predetermined retracted position in said mold, a plurality of spaced slots in said plunger transverse to the longitudinal axis of the latter, a plurality of movable knives whose leading edges are profiled to substantially the cross-section of the mold, which knives are adapted to be reciprocated through said slots to and away from the bottom of said mold and which, when moved into the mold, divide the space therein into a plurality of separate compartments, and means for independently applying pressure to said knives.

KURT GULLICH.